US007236644B2

(12) United States Patent
Suzuki et al.

(10) Patent No.: US 7,236,644 B2
(45) Date of Patent: Jun. 26, 2007

(54) IMAGE PROCESSING SYSTEM, IMAGE PROCESSING APPARATUS, IMAGE PROCESSING METHOD, AND STORAGE MEDIUM THEREOF

(75) Inventors: Kenichi Suzuki, Kanagawa (JP); Hidetomo Suwa, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 668 days.

(21) Appl. No.: 09/983,436

(22) Filed: Oct. 24, 2001

(65) Prior Publication Data

US 2002/0067519 A1 Jun. 6, 2002

(30) Foreign Application Priority Data

Oct. 30, 2000 (JP) ............................ 2000-331214

(51) Int. Cl.
*G06K 9/40* (2006.01)

(52) U.S. Cl. .......................... 382/274; 347/15; 347/19; 347/43

(58) Field of Classification Search ................. 382/274
See application file for complete search history.

(56) References Cited

U.S. PATENT DOCUMENTS

| | | | | |
|---|---|---|---|---|
| 5,729,259 | A * | 3/1998 | Gotoh et al. | 347/43 |
| 5,859,933 | A * | 1/1999 | Sasanuma et al. | 382/275 |
| 6,313,857 | B1 * | 11/2001 | Shimizu | 347/188 |
| 6,322,186 | B1 * | 11/2001 | Shimizu et al. | 347/15 |

* cited by examiner

*Primary Examiner*—Bhavesh M Mehta
*Assistant Examiner*—Christopher Lavin
(74) *Attorney, Agent, or Firm*—Fitzpatrick, Cella, Harper & Scinto

(57) ABSTRACT

To provide an image processing apparatus capable of always providing a high image quality recording image. A storage unit stores pattern information used for recording a target image on a recording medium at the unit of a pixel by means of a plurality of recording elements provided on the individual of the recording head (a plurality of pattern information items about use/no use of each recording agent in the recording elements together with a reference information item for deciding the pattern information used in recording the target pixel corresponding thereto. A correction unit corrects the information in the storage unit on the basis of the measured result of the density of the given image (test pattern) recorded in advance on the recording medium.

12 Claims, 11 Drawing Sheets

| KIND | #1 | #2 | #3 | #4 | #5 | #6 |
|---|---|---|---|---|---|---|
| DYE DENSITY | 0.125 | 0.25 | 0.5 | 1 | 2 | 3.88 |
| TRANSPARENCY DENSITY (OD VALUE) | 0.06 | 0.11 | 0.22 | 0.44 | 0.89 | 1.72 |

FIG. 9

| NO | #6 | #5 | #4 | #3 | #2 | #1 | dℓ(n) | th(n) |
|---|---|---|---|---|---|---|---|---|
| 0 | ○ | ○ | ○ | ○ | × | × | 0.0 | |
| 1 | ○ | ○ | ○ | × | ○ | × | 8.6 | 4.3 |
| 2 | ○ | ○ | ○ | × | × | × | 17.3 | 13.1 |
| 3 | ○ | ○ | × | ○ | ○ | × | 25.9 | 21.6 |
| 4 | ○ | ○ | × | ○ | × | × | 34.6 | 30.4 |
| 5 | ○ | ○ | × | × | ○ | × | 43.2 | 38.9 |
| 6 | ○ | ○ | × | × | × | × | 51.9 | 47.6 |
| 7 | ○ | × | ○ | ○ | ○ | × | 60.5 | 56.2 |
| 8 | ○ | × | ○ | ○ | × | ○ | 64.8 | 62.7 |
| 9 | ○ | × | ○ | ○ | × | × | 69.2 | 67.0 |
| 10 | ○ | × | ○ | × | ○ | ○ | 73.5 | 71.3 |
| 11 | ○ | × | ○ | × | ○ | × | 77.8 | 75.6 |
| 12 | ○ | × | ○ | × | × | ○ | 82.1 | 80.0 |
| 13 | ○ | × | ○ | × | × | × | 86.4 | 84.3 |
| 14 | ○ | × | × | ○ | ○ | ○ | 90.8 | 88.6 |
| 15 | ○ | × | × | ○ | ○ | × | 95.1 | 92.9 |
| 16 | ○ | × | × | ○ | × | ○ | 99.4 | 97.2 |
| 17 | ○ | × | × | ○ | × | × | 103.7 | 101.6 |
| 18 | ○ | × | × | × | ○ | ○ | 108.1 | 105.9 |
| 19 | ○ | × | × | × | ○ | × | 112.4 | 110.2 |
| 20 | ○ | × | × | × | × | ○ | 116.7 | 114.5 |
| 21 | ○ | × | × | × | × | × | 121.0 | 118.9 |
| 22 | × | ○ | ○ | ○ | ○ | × | 125.3 | 123.2 |
| 23 | × | ○ | ○ | ○ | × | ○ | 129.7 | 127.5 |
| 24 | × | ○ | ○ | ○ | × | × | 134.0 | 131.8 |
| 25 | × | ○ | ○ | × | ○ | ○ | 138.3 | 136.1 |
| 26 | × | ○ | ○ | × | ○ | × | 142.6 | 140.5 |
| 27 | × | ○ | ○ | × | × | ○ | 147.6 | 144.8 |
| 28 | × | ○ | ○ | × | × | × | 151.3 | 149.1 |
| 29 | × | ○ | × | ○ | ○ | ○ | 155.6 | 153.4 |
| 30 | × | ○ | × | ○ | ○ | × | 159.9 | 157.8 |
| 31 | × | ○ | × | ○ | × | ○ | 164.2 | 162.1 |
| 32 | × | ○ | × | ○ | × | × | 168.6 | 166.4 |
| 33 | × | ○ | × | × | ○ | ○ | 172.9 | 170.7 |
| 34 | × | ○ | × | × | ○ | × | 177.2 | 175.0 |
| 35 | × | ○ | × | × | × | ○ | 181.5 | 179.4 |
| 36 | × | ○ | × | × | × | × | 185.9 | 183.7 |
| 37 | × | × | ○ | ○ | ○ | ○ | 190.2 | 188.0 |
| 38 | × | × | ○ | ○ | ○ | × | 194.5 | 192.3 |
| 39 | × | × | ○ | ○ | × | ○ | 198.8 | 196.7 |
| 40 | × | × | ○ | ○ | × | × | 203.1 | 201.0 |
| 41 | × | × | ○ | × | ○ | ○ | 207.5 | 205.3 |
| 42 | × | × | ○ | × | ○ | × | 211.8 | 209.6 |
| 43 | × | × | ○ | × | × | ○ | 216.1 | 213.9 |
| 44 | × | × | ○ | × | × | × | 220.4 | 218.3 |
| 45 | × | × | × | ○ | ○ | ○ | 224.8 | 222.6 |
| 46 | × | × | × | ○ | ○ | × | 229.1 | 226.9 |
| 47 | × | × | × | ○ | × | ○ | 233.4 | 231.2 |
| 48 | × | × | × | ○ | × | × | 237.7 | 235.6 |
| 49 | × | × | × | × | ○ | ○ | 242.0 | 239.9 |
| 50 | × | × | × | × | ○ | × | 246.4 | 244.2 |
| 51 | × | × | × | × | × | ○ | 250.7 | 248.5 |
| 52 | × | × | × | × | × | × | 255.0 | 252.8 |
| ※ | ○ | ○ | ○ | × | × | ○ | 13.0 | 10.8 |
| ※ | ○ | ○ | × | ○ | × | ○ | 30.3 | 28.1 |
| ※ | ○ | ○ | × | × | ○ | ○ | 38.9 | 36.7 |
| ※ | ○ | ○ | × | × | × | ○ | 47.5 | 45.4 |

| | | | | |
|---|---|---|---|---|
| − | − | * | 7 | 3 |
| 1 | 3 | 7 | 3 | 1 |
| 0 | 1 | 3 | 1 | 0 |
| 0 | 0 | 1 | 0 | 0 |

TOTAL: 31

| Δn | WHEN THE NUMBER OF PLACING IS 4 | WHEN THE NUMBER OF PLACING IS THREE OR LOSS |
|---|---|---|
| >0.03 | IF THERE IS #1, DELETE #1, AND #2 IS CHANGED INTO #1 IF THERE IS NOT #1 AND THERE IS #2. WHEN THERE ARE NOT #1 AND #2, IGNORE | IF THERE IS #1, DELETE #1, AND #2 IS CHANGED INTO #1 IF THERE IS NOT #1 AND THERE IS #2. WHEN THERE ARE NOT #1 AND #2 AND THERE IS #3, CHANGE #3 TO #2, AND ADD #1 |
| 0.03>>−0.03 | DISREGARD | DISREGARD |
| −0.03> | #1 IS CHANGED INTO #2 IF THERE IS #1. IGNORE, WHEN THERE IS NOT #1 | ADD #1 |

IMAGE PROCESSING SYSTEM, IMAGE PROCESSING APPARATUS, IMAGE PROCESSING METHOD, AND STORAGE MEDIUM THEREOF

BACKGROUND OF THE INVENTION

1. Field of the Invention

The present invention relates to an image processing system, an image processing apparatus, an image processing method and a storage medium.

2. Related Background Art

Since formerly, recorders such as, e.g. a printer, a copier and a facsimile have been so arranged as to record an image composed of dotted patterns on a recording medium such as, e.g. paper and thin plastic sheet.

Such recorders can be classified into ink-jet type, wire-dot type, thermal type and laser beam type.

An ink-jet type recorder (hereinafter, referred to as ink jet recorder also), for example, is simple in configuration and is so arranged as to discharge and fly ink droplets (recording agent) from a discharge port and stick them onto a recording medium.

Besides, as for an apparatus answering to requirements (high speed recording, high resolution, high image quality, low noise and so on) in recent years when numerous recorders have put to use, an ink jet recorder is implemented as a relatively small-sized apparatus and has become rapidly widespread.

Besides, as ink jet recorders, those using a recording head with multiple ink discharge ports integrally disposed for a purpose of improving the recording speed or the like and those with a plurality of the above recording heads corresponding to colored recording are widespread in a great number.

Furthermore, in ink jet recorders, a half tone processing method such as dither method or error dispersion method is adopted as the method of faithfully reproducing the gradation of an image information item from requirements of high resolution, high image quality or the like.

The above gradation reproducing method makes image recording of excellent gradation possible in case of sufficiently high resolution (such as above the order of 1000 dots/inch) in an ink jet recorder.

In the case of low resolution (order of 360 or 720 dots/inch) in an ink jet recorder, however, recording dots in the highlight part of an image is prominent and the rough feeling of a recording image is apt to occur due to the discontinuity of pixels.

Thus, as a method of solving the above problem, there is a way to increase the number of grades in one pixel by making recording dots themselves into multi-valued ones.

Specifically, by controlling the voltage, the pulse width or the like to be applied to a recording head, for example, a way to modulate the diameter of recording dots stuck onto a recording medium to implement a recording image of high gradation is known.

On account to the high dependence on environments, however, the above way is unstable in the diameter of recording dots and further the presence of a limit to the size of recordable minimum recording dots makes it difficult to implement a high gradation recording image.

Besides, a way to change the density of recording dots within a matrix at the size of recording dots which is kept constant (density modulating process) is considered, but this process necessitates a considerable area to raise the number of grades and consequently the resolution of a recording image never fails to worsen.

Thus, as a method of solving the above problems, there have been proposed a way to implement a high gradation recording image by shooting a plurality of ink (recording agent) droplets off at substantially the same spot toward a recording medium to thus form a single dot and at this time changing the number of ink shot droplets (multi-droplet scheme), a way to use a plurality of ink types different in density and to implement a high gradation recording image based on at least two recording dots concerning the similar colors or a method composed of a combination of these two has been proposed and put to practical use.

Thereby, in an ink jet recorder, a recording image of improved gradation property, high density and high gradation can be obtained.

On the other hand, numbers of laser-beam type recorders are utilized, for example, in the field of medical treatment.

Specifically, at first, as an image used for image diagnosis in the field of medical treatment, use has still been made of a monochromatic image, recorded monochromatically.

The reason for this is that a monochromatic image is higher in density resolution to human eyes than a colored image. Especially, in case of requiring the density resolution to a great extent, a monochromatic image is used because the monochromatic image becomes more abundant in information content recognizable for human being than any colored image.

Besides, as recording media of an image, a transparent type recording medium is known to be greater in density resolution recognizable for human being than a reflective type image.

Generally speaking, the density resolution to human eyes for a colored image is said to be on the order of 8 bits, whereas it is said to be 10 to 11 bits for a monochromatic image.

Besides, regarding medical X-ray photographs or CT/MRI images recorded to transparent recording materials (transparent media), readout to the human density resolution limit is actually possible and providing an information item for image diagnosis is known to be possible.

Thus, as the recorder for recording a high gradation monochromatic image as mentioned above, a laser-beam type recorder (hereinafter, referred to as "laser imager" also) is utilized.

This laser imager is so arranged as to irradiate laser rays modulated corresponding to an image information item onto a silver salt film and to form an image on the film by the developing treatment of the film and image are often recorded at a density resolution of 12 bits with some degree of margin allowed in considerations.

However, conventional recorders such as above-mentioned ink-jet type or laser-beam type have the following problems.

First, in an ink-jet type recorder, the ink concentration in an ink tank rose with the lapse of time owing to a gradual evaporation of the ink resolvent or other like causes and a balance of gradation in a recorded image was destructed in certain cases. Especially, in a multi-droplet type or a type of expressing the gradation of an image by using ink of similar color and different densities, a fluctuation of ink density as mentioned above brings about the destruction of balance in the gradation of a recording image, the loss of smoothness in gradation and further the formation of a pseudo contour on the recorded image, thereby resulting in damages to the image quality of the recording image in certain cases.

Besides, as recording media of record image target, using 10 kinds or more of recording media different in image quality, durability and price is considered corresponding to purposes. In this case, depending on a combination of recording medium and ink or a combination of overlapping-eject ink, the amount of ink absorption, the rate of ink absorption or the size of a record dot formed differs, so that in the gradation of a record image a jump of density had occurred or an inversion of density had occurred in certain cases.

Besides, in the case when the ratio of the density change of different density ink is not constant, there is also a problem that a jump of density has occurred in the record image.

Consequently, in conventional ink-jet type recorders, the gradation of a record image is degenerated in some cases.

On the other hand, the laser-beam type recorder (laser imager) is very expensive and application of a wet developing treatment to a film is necessary and further there were problems such as waste liquid disposal and troublesome maintenance.

Besides, a dry silver-salt type developing treatment so arranged as to carry out a developing treatment by heating in place of a wet developing treatment is also present, but even in this laser imager, there was a problem of inferior image quality in contrast to an image obtained by the wet developing treatment.

Thus, to solve these problems, a recorder of carrying out the image recording of 256 grades is proposed, for example, by use of the ink-jet type capable of 50 grades or more at 600 dpi and further by addition of error diffusion treatment.

Using this recorder, an X-ray image was actually recorded at 4096 grades in place of 256 grades to obtain a good image then.

With the above recorder, however, several problems in image quality took place in certain kinds of images to be recorded in contrast to the image quality of a record image obtained by a laser imager.

Specifically, FIG. 16 shows one example of result of recording a chest X-ray photograph on a transparent film.

As shown in FIG. 16, a contour 901 appears at the part of shoulder of a photographed body in the record image 900 (chest X-ray image on the transparent film). This contour 901 at the shoulder part does not appear on a normal X-ray photo and the shoulder part in the X-ray photo smoothly changes in density.

A contour 901 as mentioned above is referred to as "pseudo contour" in a meaning that a contour appears notwithstanding the original absence of any contour.

In addition to the contour 901, the pseudo contour appears also at a portion smoothly changing in the density of record image 900.

Besides, to prevent the pseudo contour, even if the conventional correction method is used, there are cases where a contour cannot be completely prevented.

SUMMARY OF THE INVENTION

Thus, the present invention is achieved to remove the above drawbacks and its purpose is to provide an image processing apparatus, an image processing system and an image processing method capable of always providing a high image quality recording image and a storage medium on which a computer readably stores a processing step for implementing this image.

To attain the above purpose, a first invention is an image processing apparatus of performing the process for recording a target image on a recording medium at the unit of a pixel by means of a plurality of recording elements, including: storage means for correspondingly storing a plurality of pattern information about use/no use of each of recording agents in the above recording elements together with a reference information for deciding the pattern information used in recording the target pixel; measuring means for measuring the density of the given (predetermined) image recorded in advance on the above recording medium; and correction means for correcting the information item in the above storage means on the basis of the measured result of the above measuring means.

In the above first invention, a second invention is featured by containing at least either of the densities of grades gradation expressed in terms of the corresponding pattern information item and a given density threshold.

In the above first invention, a third invention is characterized in that the above storage means stores the above pattern information corresponding to the distance from a reference position on the above given image and the above correction means corrects a reference information of the pattern corresponding to the position of the above object pixel on the basis of the density of the object pixel in the above given image obtained from the above measured result.

In the above third invention, a fourth invention is characterized in that the above correction means corrects information of the pattern corresponding to the position of the above object pixel on the basis of the difference of the density of the above object pixel from that of grade expressed in terms of the pattern information item corresponding to the position of the above object pixel contained in the above reference information.

In the above first invention, a fifth invention is characterized in that the above measuring means measures the densities of the above given images stored in advance on the above recording medium and the above correction means corrects the information within the above storing means at least on the basis of the measured result on the above recording medium and the measured result of the density of any image among the above given images externally indicated on the basis of any of the measured results of the above measuring means.

In the above first invention, a sixth invention is featured by comprising control information generation means for generating a control information item for the recording operation of a target pixel on the basis of the density of the target pixel and the information within the above storage means after the correction by the above correction means.

In the above first invention, a seventh invention is characterized in that the above given image contains a gray-scale test pattern.

The eighth invention relates to an image processing system with a plurality of installations connected so as to communicable to each other and is characterized in that at least one installation out of the above installations has the function of an image processing apparatus as set forth in either of first to seventh invention.

The ninth invention relates to an image processing method of recording a target image at the unit of a pixel onto a recording medium by means of a plurality of recording elements, including a first recording step of recording a given image onto the above recording medium; a measuring step of measuring the density of the given image recorded on the above recording medium by the first recording step; and a correction step of correcting the information in the storage means in which a plurality of pattern information items about use/no use of each recording agent in the above recording elements are stored correspondingly together with a reference information item for deciding the pattern information used in recording a target image.

In the above ninth invention, a tenth invention is characterized in that the above reference information item contains at least either the density of expressed in terms of the corresponding pattern information item or a given density threshold.

In the above ninth invention, an eleventh invention is characterized in that the above storage step stores the above pattern information items into the above storage means corresponding to the distance from a reference position on the above given image and the above correction step includes a step of correcting the reference information item of the pattern corresponding to the position of the relevant object pixel on the basis of the density of the object pixel of the above given image obtained from the above measured result.

In the above eleventh invention, a twelfth invention is characterized in that the above correction step includes a step of correcting the pattern information item corresponding to the position of the above object pixel on the basis of the difference of the density of the above object pixel from that of the grade expressed in terms of the pattern corresponding to the position of the above object image contained in the above reference information.

In the above ninth invention, a thirteenth invention is characterized in that the above first recording step includes a step of recording the above given images onto the above recording medium; the above measuring step includes a step of measuring the density of the given images recorded by the above first recording step on the above recording medium; and the above correction step includes a step of correcting the information within the above storage means at least on the basis of the measured result on the above recording medium and the measured result of the density of any image among the above given images externally indicated on the basis of any of the measured results by the above measuring step.

In the above nine invention, a fourteenth invention is characterized by further comprising a second recording step of carrying out the recording of a target image onto the above recording medium on the basis of both the density of the target pixel and the information items within the above storage means after the completion of correction by the above correction step.

In the above nine invention, the fifteenth invention is characterized in that the above given image contains a gray-scale test pattern.

A sixteenth invention relates to a recording medium that a computer readably stores a processing program for executing the function of the image processing apparatus as set forth in either first to seventh invention or that of the image processing system as set forth in eighth invention.

A seventeenth invention relates to a recording medium that a computer readably stores the processing step of the image processing method as set forth in either nineth to fifteenth invention.

Further functions and features of the present invention will be apparent from the subsequent drawings and embodiments.

BRIEF DESCRIPTION OF THE DRAWINGS

FIG. 9 is an illustration of one example of combined table of ink superimposed printing stored into a recording medium of the above described image record control section;

DETAILED DESCRIPTION OF THE PREFERRED EMBODIMENTS

Figure 1:
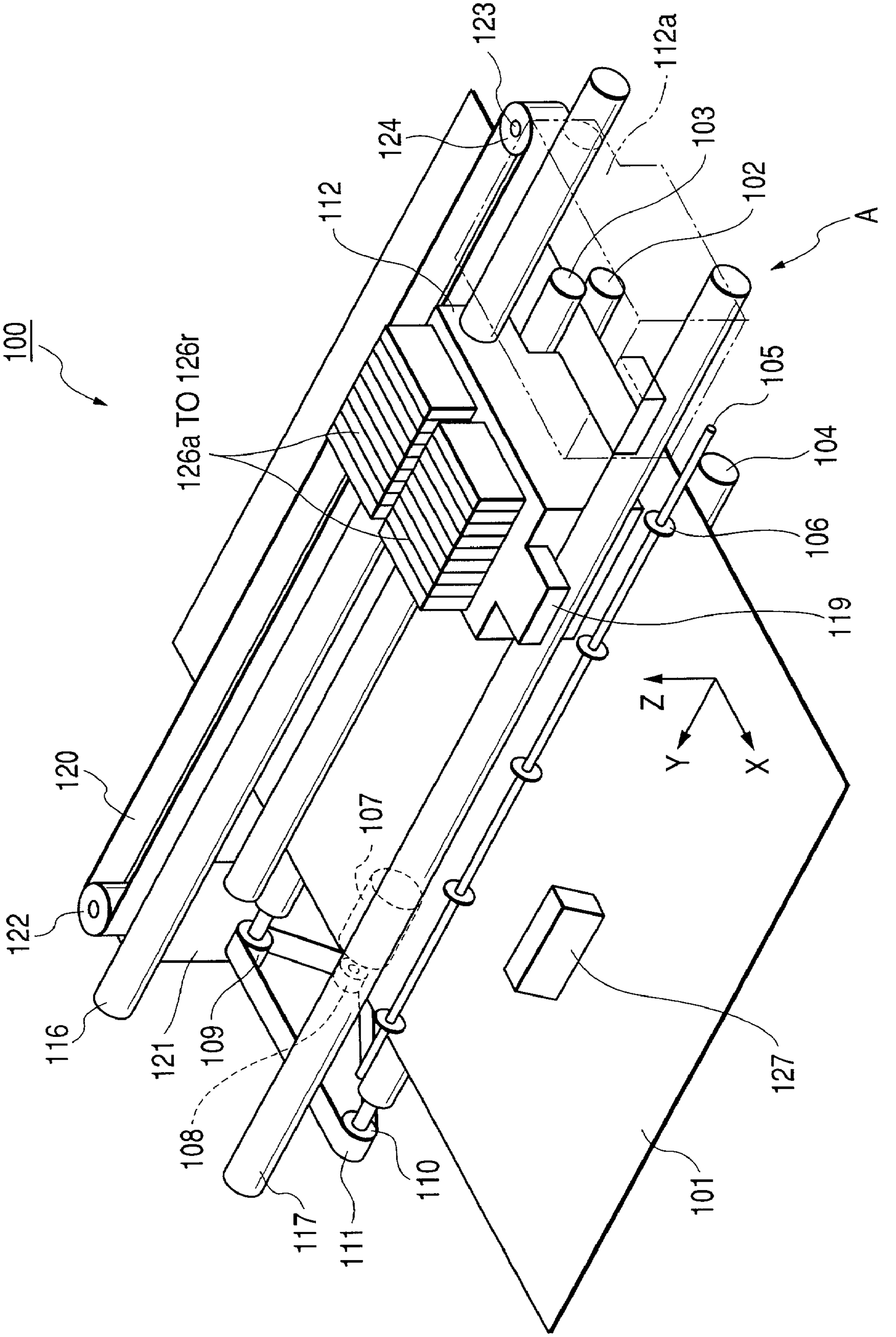
FIG. 1 is a perspective view for illustrating a configuration of a recording section of an ink jet recorder to which the present invention is applied.

Referring to the drawings, the preferred embodiments of the present invention will be described below.

The present invention is applied to an ink jet recorder, for example, provided with a recording section 100 as shown in FIG. 1.

Incidentally, here to simplify the description, an ink jet recorder according to this embodiment (hereinafter, simply referred to as "recorder") is regarded as using an additive ink/film system to record a transparent image as the monochromatic image.

Configuration of the Recording Section 100 in This Embodiment

Figure 2:
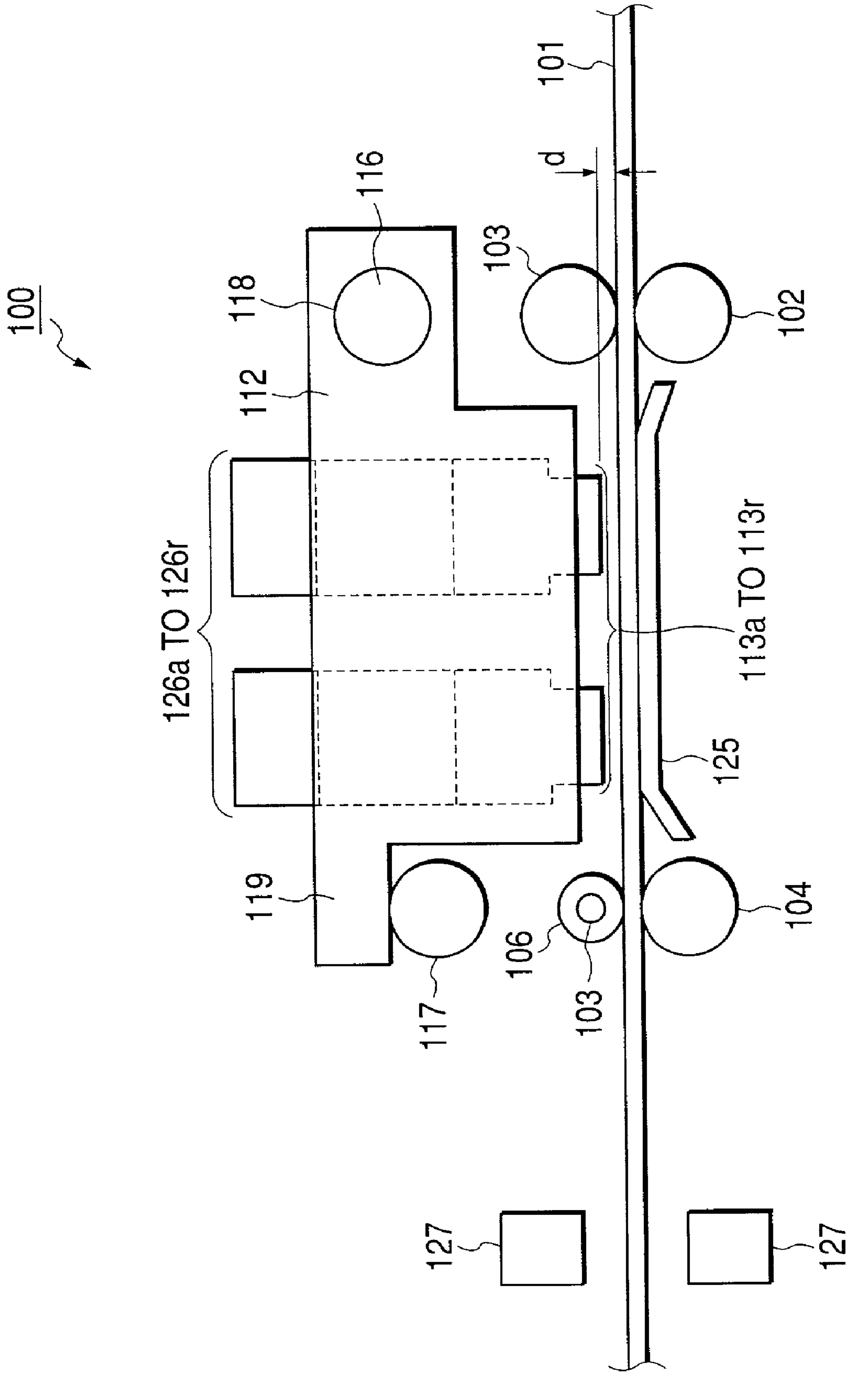
FIG. 2 is a side view (looking along arrow A) of the above described recording section.

FIG. 1 is a perspective view of a recording section 100; FIG. 2 is a side view (view looking along an Arrow A) from the direction designated with "A" in FIG. 1; and FIGS. 3 and 5 are detailed illustrations of the main constituent of the recording section 100.

Figure 3:
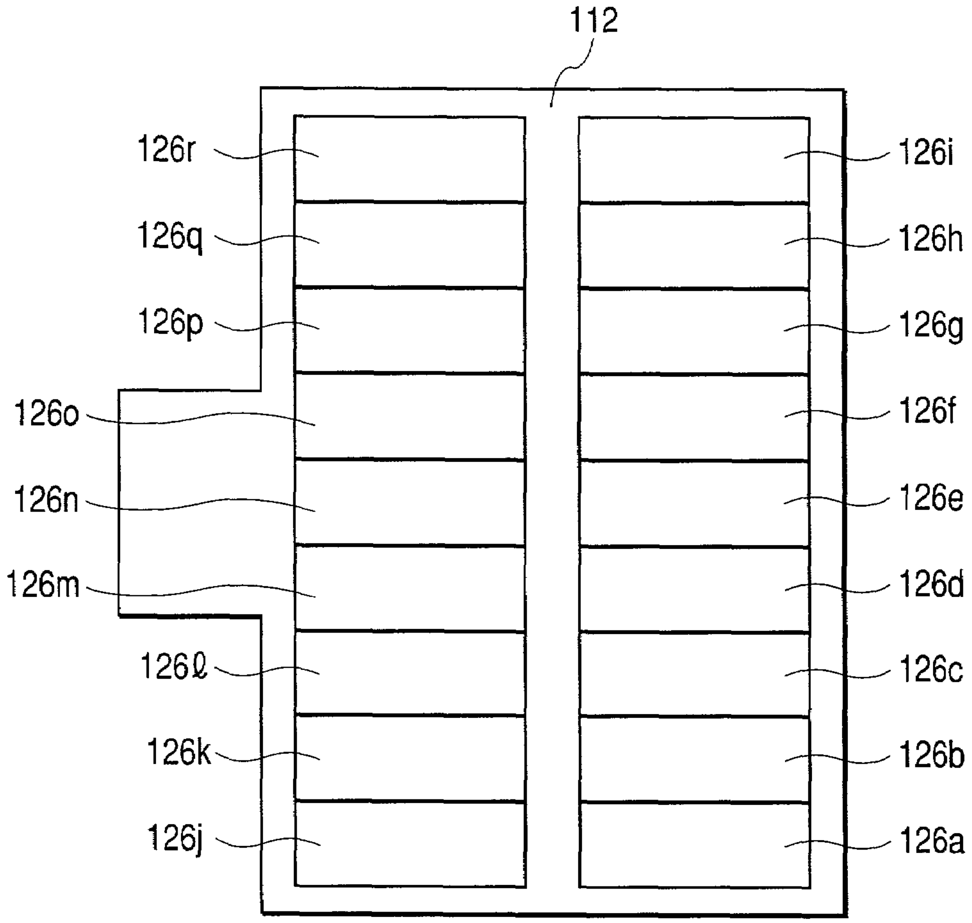
FIG. 3 is an illustration of installing a reserve tank in a carriage of the above described recording section.
Figure 4A:
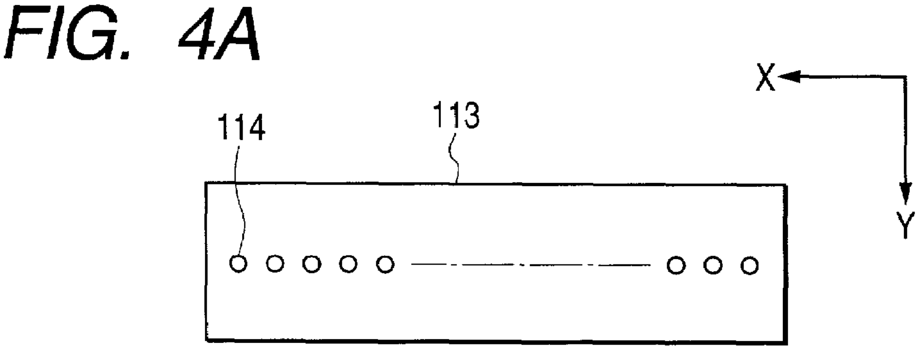
FIGS. 4A and 4B are illustrations of the head of the above described recording section.
Figure 4B:
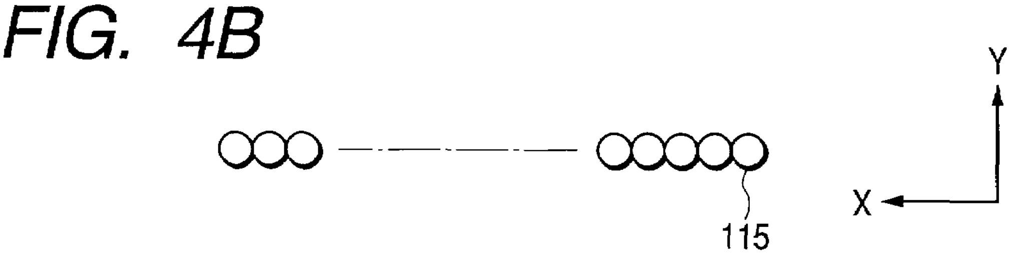

FIG. 3 is an illustration of the top-viewed situation of a carriage 112 in the aspect shown in FIG. 1; FIG. 4A is an illustration of the bottom-viewed situation of any one head (113) out of heads 113*a* to 113*r* in the aspect shown in FIG. 2; FIG. 4B is an illustration of the situation of ink printed through a nozzle 114 (recording element) of the relevant head (113) onto a sheet 101 of recording medium; and FIG. 5 is an illustration of the bottom-viewed situation of a carriage 112 in the aspect shown in FIG. 1.

Figure 5:
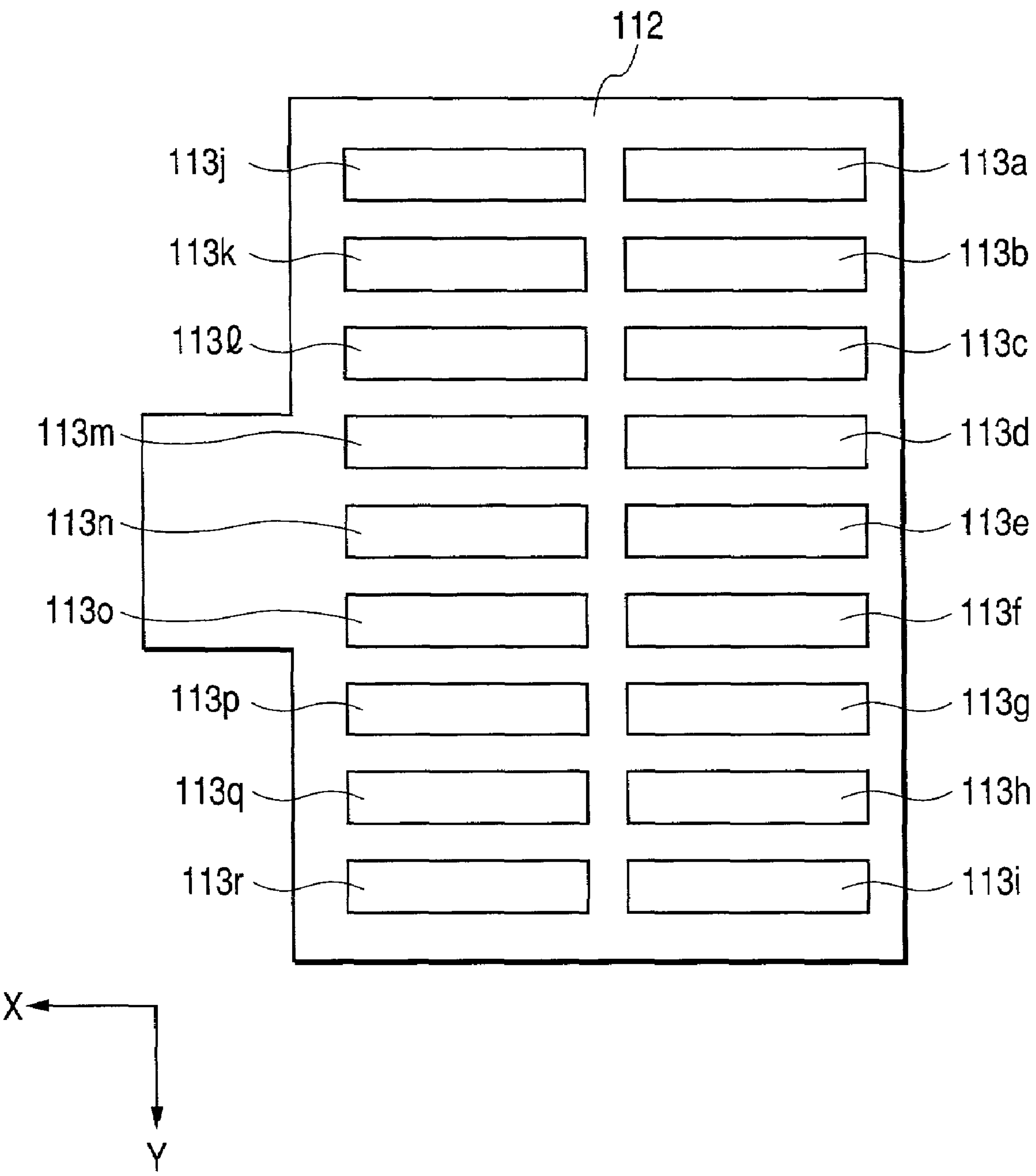
FIG. 5 is an illustration of installing a head in the carriage of the above described recording section.

In FIGS. 1 and 5, reference numeral "101" denotes a sheet serving as the recording medium on which an image is recorded.

Reference numerals "102" vs. "103" and "104" vs. "105" are used respectively in pairs and denote rollers, conveying a sheet 101 in the X-direction; and reference numeral "106" denotes a bulge provided so as to come into contact with the sheet 101. At the roller 105, bulges 106 are partly provided.

Reference numeral "107" denotes a motor; and reference numeral "108" denotes a pulley attached to the axis of the motor 107.

Reference numerals "109" and "110" denote pulleys attached to one end of the rollers 102 and 104; and reference numeral "111" denotes a belt. The pulleys 109 and 110 are combined with the pulley 108 by means of the belt 111.

By such an arrangement, the rollers 102 and 104 rotate with the rotation of the motor 107. Besides, the rollers 103 and 105 are energized in the direction of press onto the rollers 102 and 104 by means of an unillustrated mechanism to convey the sheet 101 in the X-direction by this arrangement.

Reference numerals "113*a* to 113*r*" denote a plurality of heads; and reference numeral "112" denotes a carriage for mounting the heads 113*a* to 113*r* (See FIG. 5). On the respective heads 113*a* to 113*r*, as shown in FIG. 4A, many nozzles 114 (recording elements) are provided opposite the sheet plane 501.

Reference numerals "116" and "117" denote shafts slidably holding the carriage 112. The shaft 116 penetrates a hole 118 provided on the carriage 112, while a protruding portion 119 provided on the carriage 112 is so structured as to ride on the shaft 117.

By such an arrangement, the plane on which the nozzles of the heads 113*a* to 113*r* are provided is forced to be opposed to the sheet 101 at a distance of d.

Reference numeral "120" denotes a belt partly fixed to the carriage 112; and Reference Numeral "121" denotes a motor.

Reference numeral "122" denotes a pulley attached to the axis of the motor 121; and reference numeral "124" denotes a pulley rotatably attached to the rigid axis 123. The pulleys 122 and 124 are combined by means of the belt 120.

By such an arrangement, the carriage 112 becomes movable toward the Y-direction and its opposite direction in accordance with the rotation of the motor 121 and becomes movable over the whole region in the Y-direction of the sheet 101, to the wait position 112*a* of the carriage 112 and to a position symmetrical to the position 112*a* about the sheet 101.

Incidentally, while the carriage 112 moves on the sheet 101, the gap between the nozzle faces of the headers 113*a* to 113*r* mounted on the carriage 112 and the sheet 101 is so arranged as to be kept at a given distance of d.

Reference numerals "126*a*" to "126*r*" denote reserve tanks, which are mounted to the heads 113*a* to 113*r* correspondingly. The reserve tanks 126*a* to 126*r* respectively supply ink to the corresponding heads.

Connected to the reserve tanks 126*a* to 126*r* are unillustrated tubes and the tubes are further connected to unillustrated ink tanks. Thereby, ink is permitted to be supplied from the ink tanks to the reserve tanks 126*a* to 126*r*.

Incidentally, here, to simplify the description, the reserve tanks 126*a* to 126*r* and the heads 113*a* and 113*r* are assumed to be prepared in 12 parts (a to r) for each. Besides, as one example of itemization, it is assumed that 6 kinds of black different in density are considered (hereinafter, designated with "#1" to "#6" from the most dilute) and two lots are prepared for each density.

Reference numeral "125" denotes a sheet guide provided between the roller 102 and the roller 104.

Reference numeral "115" denote dots formed on the sheet 101 when ink is discharged through nozzles onto the sheet 101 by such an arrangement.

Reference numeral "127" denotes a density measurement unit for measuring the density of dots 115 as a test pattern formed (recorded) onto the sheet 101.

Specifically, the density measurement unit 127 has, for example, a light source such as LED, a light detector such as phototransistor and a measurement circuit to which to input an electric signal issued from the light detector. By such an arrangement, the density measurement unit 127 detects the intensity of light emitted from the light source and transmitted through the sheet 101 and the density of the test pattern (dots 115) recorded on the sheet 101 is detected from the detected result.

Figure 6A:
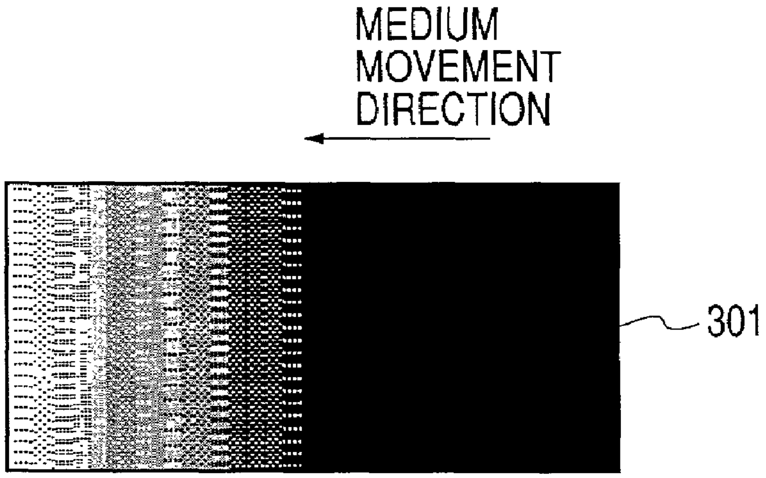
FIGS. 6A and 6B are illustrations of one example of a test pattern used for an automatic density calibration in the above described recorder.

A density measurement unit 127 as mentioned above, the details of which will be described below, detects (measures) the density of the gray scale test pattern 301 on the sheet 101 corresponding to the position of the sheet 101 while the sheet 101 is conveyed at a constant rate, directly after recording a gray scale test pattern 301 as shown in FIG. 6A onto the sheet 101, and then makes up data for the auto-calibration in accordance with this measured density.

Incidentally, the density measurement method at the density measurement unit 127 is not limited to a measurement method (density measurement of an transmitted image) as mentioned above, but it may be so arranged, for example, that the test pattern recorded on the sheet 101 (recorded medium) is irradiated and the reflective light is read to measure the density.

Configuration of Recording Control of Recorders in This Embodiment

Figures 7, 8:
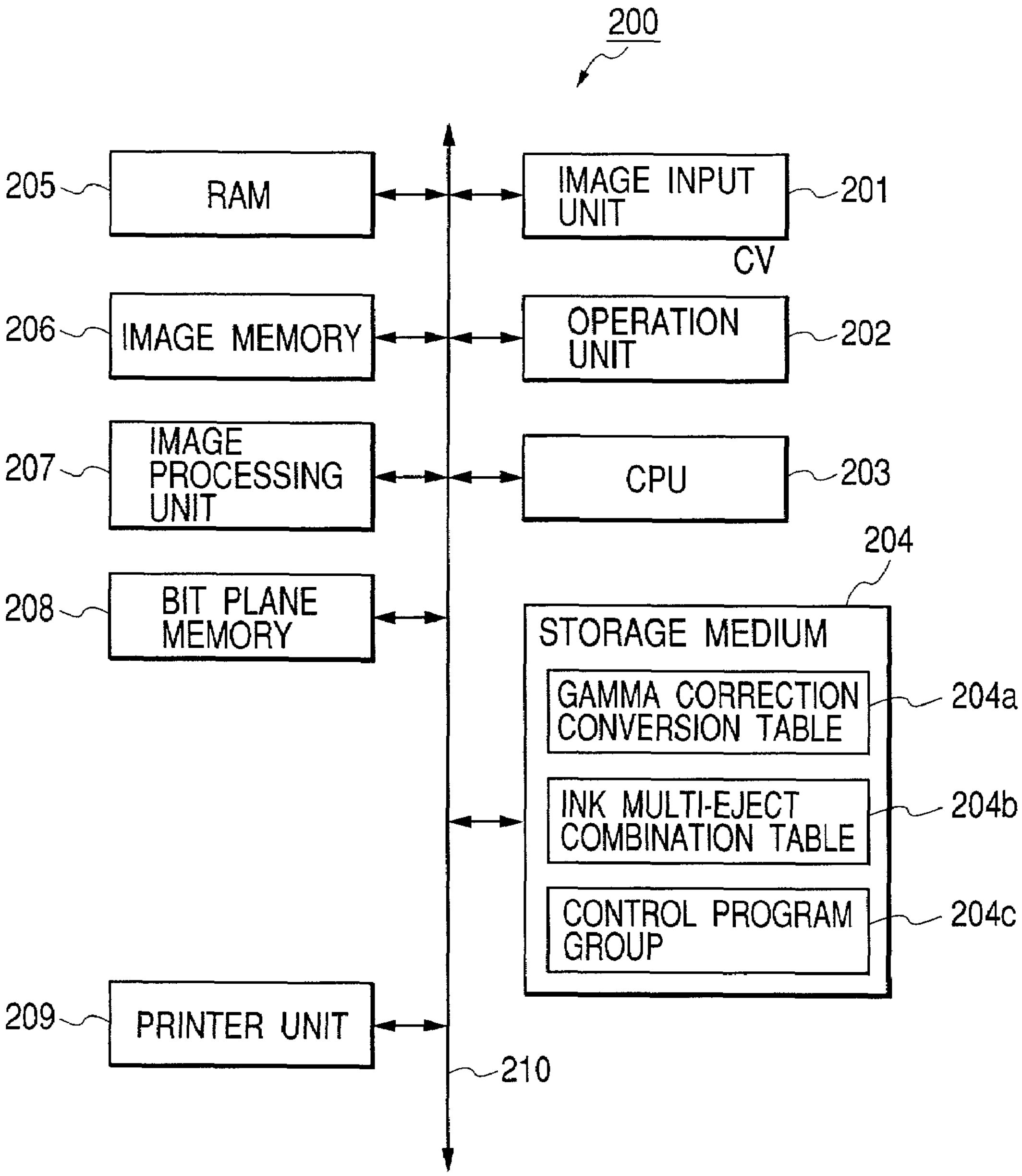
FIG. 7 is a block diagram showing a configuration of a record control section in the above described recorder.
FIG. 8 is an illustration of ink used in the above described recording section.

As recording control means for controlling the recording section 100 shown by FIGS. 1 and 5, a recorder according to this embodiment is equipped with a recording control section 200 as shown in FIG. 7.

As shown in FIG. 7, the recording control section 200 comprises an image input unit 201 for inputting the image data of record target; an operation unit 202 in which the operation for the instruction of various operations is carried out from a user; a CPU 203 for supervising the operation control over the whole recorder in this embodiment; a storage medium 204 for storing a program and various data for the operation control in the CPU 203; a RAM 205 used as a working area or the like by the CPU 203; an image memory 206 for storing the image data inputted by the image input unit 201; an image processing unit 207 for applying various image processing to the image data in the image memory 206; a bit plane memory 208 for storing the image data after the processing made in the image processing unit 207; and a printer 209 for accomplishing the record processing to the sheet 101 by the recording section 100 shown by FIGS. 1 and 5, where these constituent units 201 to 209 are so arranged that data are given/received mutually through a bus line 210.

The image input unit 201 inputs the image data of record target (image data comprising density data (CV value) for individual pixels) supplied via unillustrated communication means.

At the operation unit 202, various keys are provided for executing the setting of various parameters, instruction of recording start or the like.

By reading out and executing various programs stored in advance in the storage medium 204, the CPU 203 controls the entire operation of the present recorder.

Stored in the storage medium 204 together with the gamma correction conversion table 204*a* used at image processing in the image processing unit 207 and the ink multi-eject combination table 204*b* are the control program executed by the CPU 203, a group of control programs 204*c* including a program for error processing or the like.

The gamma correction conversion table 204*a* is a table to be consulted in executing the gamma conversion processing as image processing in the image processing unit 207. The gamma conversion processing here includes processing of converting a modality-dependent gamma curve into a desired gamma curve in image recording onto a sheet 101 by means of the recording section 100.

Incidentally, the details of the ink multi-eject combination table 204*b* will be described below. Besides, the following operation of this recorder is implemented entirely by the CPU 203 readout and execution of programs in the storage medium 204.

Besides, as the storage medium 204, ROM, FD, CD-ROM, HD, a memory card, a photomagnetic disk or the like is applicable.

The RAM 205 is used as a work area during the execution of various processing in this recorder, a temporary avoiding area during the error processing, a work area during the image processing or the like.

Stored in the image memory 206 is the image data, inputted by the image input unit 201, while the image processing unit 207 makes up a discharge pattern for implementing polygrades by ink jet on the basis of the image data in the image memory 206.

Stored in the bit plane memory 208 are data of the discharge pattern obtained by the image processing unit 207.

On the basis of the discharge pattern in the bit plane memory 208, the printer unit 209 forms a dot image on the sheet 101 with the aide of the recording section 100.

The bus line 210 is a bus line for transferring an address signal, various data, a control signal or the like in this recorder.

Recording Agent Used at Recorder According to This Embodiment

The heads 113*a* to 113*r* (See FIG. 5 or the like) of the recording section 100, as shown in FIG. 8, is assumed to respectively use 6 different kinds in concentration of black recording agent (ink).

In FIG. 8, the kinds of ink are designated with "#1" to "#6" in sequence from the most dilute of density. Besides, the "dye density (%)" signifies a dye density of individual ink #1 to #6, whereas the "transparency density (OD value)" signifies a transparency density (OD value) of individual ink #1 to #6 when recorded on a transparent recording medium.

Incidentally, each of ink #1 to #6 is assumed to comprise a dye and a solvent. The "solvent" means various additives such as surfactant, humidity retainer or the like contained in water. By these additives, the discharge characteristic at the heads 113*a* to 113*r* and the absorptive characteristic on a sheet 100 are controlled.

When restriction is imposed on the number of multi-eject placing into one and the same pixel at a maximum of 4 and so as to make no multi-eject of ink at one and the same density in recording though the heads 113*a* to 114*r* using 6 kinds of ink #1 to #6, the number of grades expressible in a single pixel is:

$$6+6C2+6C3+6C4+1=57$$

Incidentally, used as ink #1 to #6 are ink kinds in such a combination of dye densities as not becoming one and the same as shown in FIG. 8. Besides, the density ratio of dot alone in the lower 4 kinds of ink #1 to #4 is represented as 1:2:4:8 from the lowest density.

Here, 53 grades out of the above 57 grades are used to record the image. Namely, 256 grades of input image data are made into 53 values to record the image.

FIG. 9 shows the kinds of ink for expressing individual grades (53 grades) in this case and one pattern example of their combination.

In FIG. 9, the column of "No." indicates individual grades ("0" to "52"). The parts indicated by "*" (parts of the remaining 4 grades other than 53 grades out of 57 grades) in this No column are patterns of combinations not used so that the difference of density levels in lower portion becomes smaller than that of the higher density portions.

In the columns of ink kinds #1 to #6, "o" indicates that ink is discharged from a head and "x" indicates that no ink is discharged from a head.

Besides, the columns of "dl [n]" (n: 0 to 52: integer) indicate ink density levels expressive of grades, which are proportional to record OD values.

Besides, the columns of "th [n]" (n: 0 to 52: integer) indicate thresholds for determining the input image data at any grades of 53 grades. This threshold th [n] is usually determined as the ink density level midway between the ink density level dl [n−1] and the ink density level dl [n]. Regarding th[1] (n=1), for example, the midway level (=4.3) between dl [0] (=0) and dl [1] (=8.6) is referred to.

Data as shown in FIG. 9 are stored as the ink multi-eject combination table 204*b* shown in FIG. 7 in the storage medium 204. And, ink density levels determined on the basis of this ink multi-eject combination table 204*b* are ink density data.

Besides, using 53 values of the ink density levels dl [0] to dl [52] indicated by No. 0 to No. 52 and using 52 values of thresholds th [1] to th [52] indicated by No. 1 to No. 52, as the details will be described below, the multi-value error diffusion process for making the input image data of 256 grades into 53 values at the image processing unit 207.

Incidentally, here, making the input image data into multi-valued ones is so arranged as to be performed by executing the multi-value error diffusion process, but the present invention is not limited to this. By another multi-valued process such as multi-value average density preservation method, multi-value dither matrix method or submatrix method, multi-valued operation of input image data may be performed.

<Internal Configuration of Image Processing Unit 207>

Figure 10:
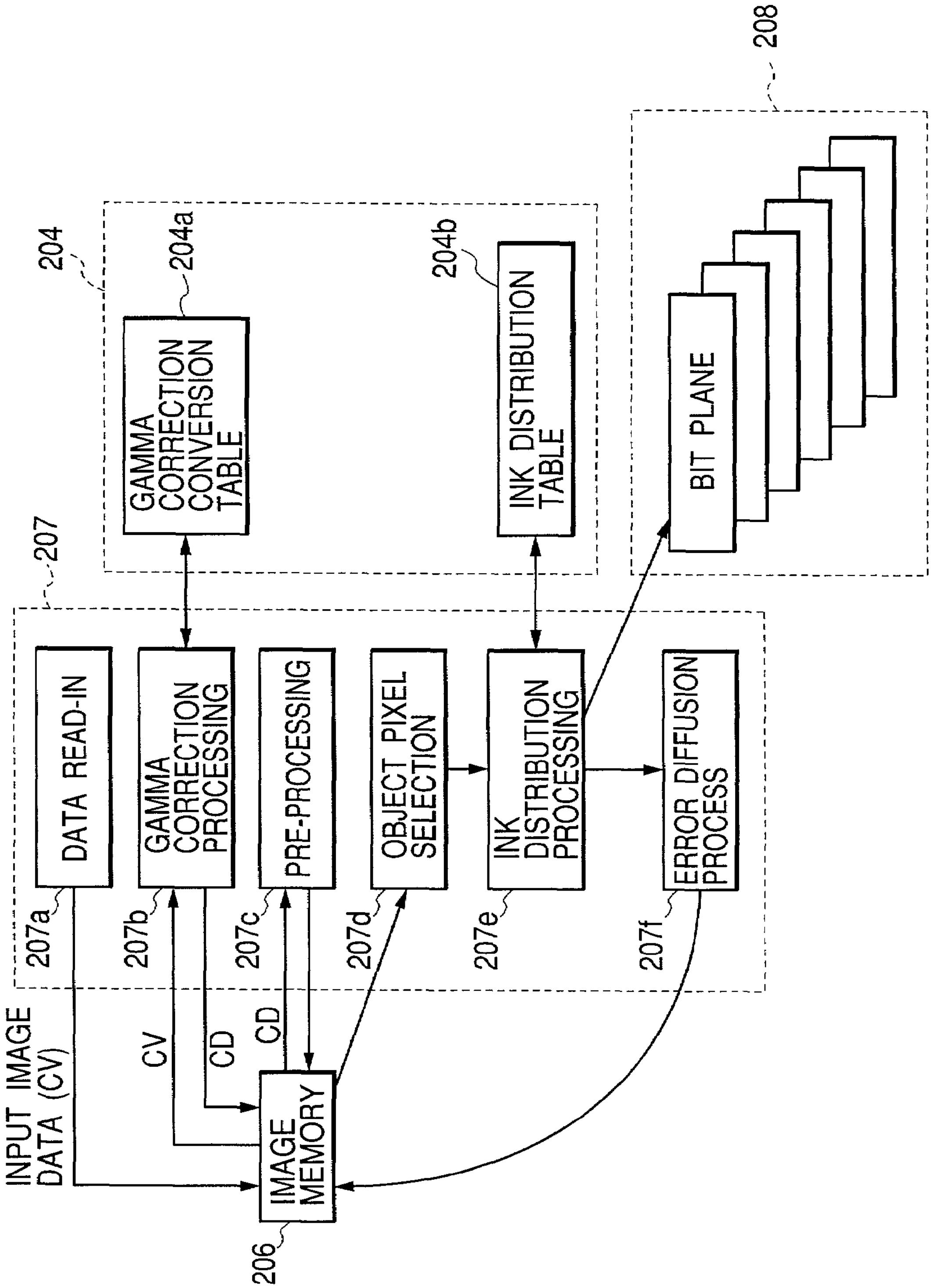
FIG. 10 is a block diagram showing a configuration of an image processing part of the above described record control section.

As shown in FIG. 10, for example, the image processing unit 207 includes a data read in part 207*a*, a gamma correction processing part 207*b*, a pre-processing 207*c*, an object pixel selection part 207*d*, an ink distribution processing part 207*e* and an error diffusion process part 207*f*.

Incidentally, individual constituent parts 207*a* to 207*f* of the image processing unit 207 shown in FIG. 10 may be so arranged as to be implemented, for example, either by hardware (image processing board) or by software. In case of arrangement by software, for example, the CPU 203 reads out a program in the control program group 204*c* of the storage medium 204, so that the function of the constituent parts 207*a* to 207*f* of the image processing unit 207 in FIG. 10 is implemented.

Thus, first, to record a desired image, a user instructs the recording operation by means of the operation unit 202.

Thereby, the data read in part 207*a* takes in input image data by means of the image input unit 201 and stores the image data into the image memory 206.

The gamma correction processing part 207*b* acquires image data from the image memory 206, converts CV values (density data) for individual pixels in the input image data into CD values, serving as signals indicating densities, on the basis of the gamma correction conversion table 204*a* and stores the CD values into the image memory 206.

The pre-processing part 207*c* applies processing such as enlargement interpolation processing, image rotation and formatting to the image data (data indicated by CV values) after the processing at the gamma correction processing part 207*b* in the image memory 206.

In the image data after the processing at the pre-processing part 207*c* in the image memory 206, the object pixel selection part 207*d* selects one pixel of processing target and acquires its CD value (density data).

Regarding the CD value of the selected pixel (target pixel) obtained at the object pixel selection part 207*d*, the ink distribution processing part 207*e* refers to the ink overlapping-eject combination table 204*b* of the storage medium 204 to acquire data of overlapping-eject ink combination, further determines binary signals of discharge/no discharge for ink of individual densities depending on the relevant data and further, according to the given rule, determines binary signals of discharge/no discharge for individual head and, stores these determined results into the bit plane memory 208 as a bit plane for each head.

The error diffusion processing part 207*f* distributes the difference (error) between the CD value of an actual object pixel and the CD value recorded according to the determination at the ink distribution processing part 207*e* (determination of a multi-eject combination) to the pixels round an object pixel. Specifically, in the image memory 206, the above error value is added to/subtracted from the CD values of surrounding pixels at which the developing process has not yet been completed.

Figures 11, 12:
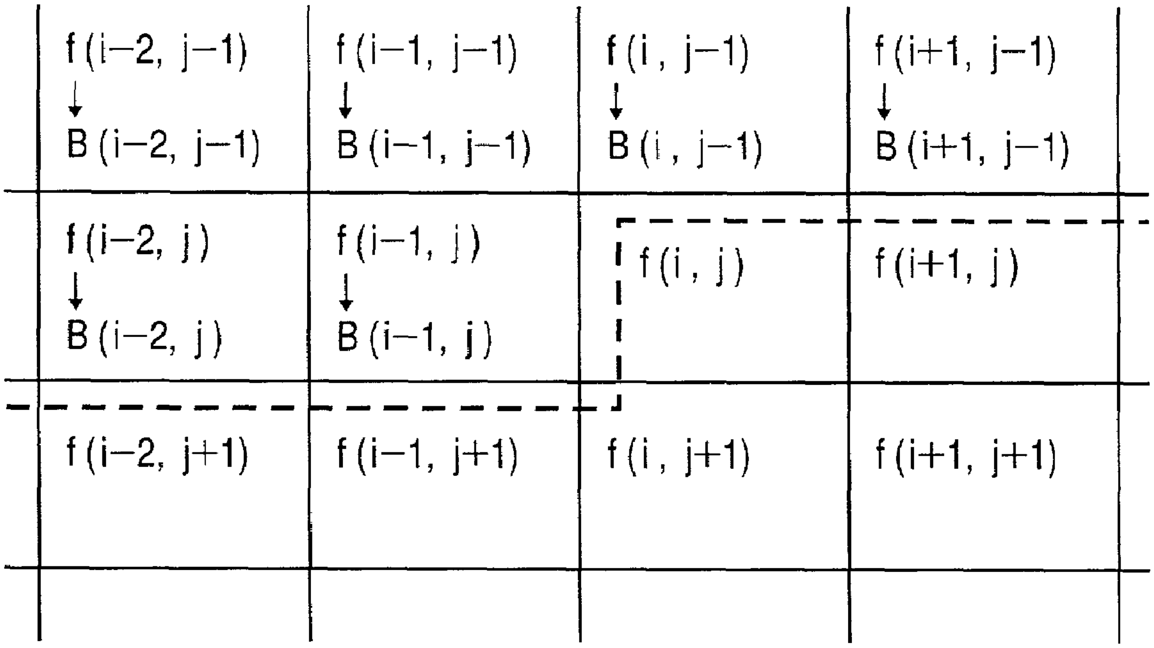
FIG. 11 is an illustration of processing at an error diffusion processing portion of the above described image processing part.
FIG. 12 is an illustration of an error diffusion matrix used at the above described error diffusion processing portion.

FIG. 11 shows a part of input image data and the image data obtained after the multi-value error diffusion process (53-valued image data) of the relevant image data in the processing at the above image processing unit 207.

Incidentally, the input image data here are assumed to be the image data after the processing of the pre-processing part 207*c*.

In FIG. 11, "f (i, j)" represents the density data (density level) of object pixel (i, j) in input image data (image data falling in the object of multi-value (53-value) operation) of 256 grades (0: black; 255 transparent).

"B (i, j)" represents the density data (53 values comprising "0", "8.6", . . . , "250.7", "255") after the multi-value (53-value) operation of the object pixel (i, j).

Accordingly, in FIG. 11, multi-value (53-value) operation has already been completed for the image data (i−2, j−1), (1−1, j) above the broken line illustrated, whereas the succeeding pixels (i, j), (i+1, j), . . . , (i, j+1), (i, j+2) are to be subsequently subjected to multi-value (53-value) operation in sequence as follows.

First, with the pixel (i, j) taken as the object pixel, the object pixel selection part 207*d* acquires its density data (CD value). The density data at this time relate to the density level f (i, j).

Next, referring to the ink distribution table 204*b* of the storage medium 204, the ink distribution processing part 207*e* performs the comparison operation between the density level f (i, j) of the object pixel (i, j) obtained at the object pixel selection part 207*d* and the threshold th [n].

Specifically, to evaluate "n" satisfying the expression:

$$th[n] \leqq f(i,j) < th[n+1] \quad (1),$$

then to determine the density data B (i, j) after the multi-value (53-value) operation of the object pixel (i, j) in accordance with Eq. (2):

$$B(i,j) = dl[n] \quad (2).$$

Besides, the ink distribution processing part 207*e* acquires the discharge pattern of the head corresponding to B (i, j) (=dl [n]) determined in accordance with Eq. (2) from the ink distribution table 204*b* of the storage medium 204 and stores this pattern into the bit plane memory 208 as a bit plane.

In the case of dl [2] (n=2), the bit plane (binary signal of discharge/no discharge) based on the discharge pattern "○○○xxx" of ink kinds #1 to #6 of No. 2 is stored in the bit plane memory 208 as the bit plane of the object pixel (i, j).

Next, by using an error diffusion matrix as shown in FIG. 12, for example, the error diffusion processing part 207*f* finds the error occurring between the density data B (i, j) determined at the ink distribution processing part 207*e* and the density data f (i, j) before the multi-value operation in accordance with Eq. (3):

$$err = f(i,j) - dl[n] \quad (3).$$

And, the error diffusion processing part 207*f* diffuses the err to surrounding pixels of the object pixel (i, j) in accordance with Eq. (4):

$$f(x,y) = f(x,y) + err * M(x-i, y-j)/31 \quad (4).$$

In Eq. (4), "f' (x, y)" represents the density data resultant from the distribution of the error err to the density data f (x, y) of surrounding pixels (x, y).

Accordingly, in accordance with the distribution of the error diffusion matrix shown in FIG. 12, the error err is diffused to individual pixels and thereafter using the density data f' (i, j) including this distributed error, the multi-value (53-value) operation is executed similarly.

The error diffusion processing concerning the object pixel (i, j) is completed by means of a series of processings described above.

With respect to pixels (i+1, j), . . . , (i, j+1), (i, j+2) thereafter, the error diffusion processing is similarly performed on the basis of the density data (DC value) thereof.

As a result of this, bit planes (binary signal of discharge/no discharge) for individual pixels responding to respective heads 113*a* to 113*r* different in density are formed to store into the bit plane memory 208.

Incidentally, as the image area subjected to error diffusion processing in image data of recording target, it is allowable to move to a process for the next recording after the completion of a bit plane for one page, for example, by subjecting the entire image area for one page to error diffusion processing. Or, such processing for each divided area is also allowable as dividing the image area into multiple parts, completing a bit plane of target area and performing the recording process, then taking the next area as the target area to complete the bit plane of the relevant area and perform the recording process.

When bit planes of the heads 113*a* to 113*r* are completed as mentioned above, the printer unit 209 starts the following recording operation recording operation (recording process) by the recording section 100.

Specifically, if description is made using FIG. 2, first, a sheet 101 is conveyed from the left direction to between the roller 102 and the roller 103 in FIG. 2 by unillustrated means.

Next, by a motor 107, the sheet 101 is intermittently conveyed a given distance d for each time in the X-direction.

At this time, while the sheet 101 stops, the motor 121 rotates and the carriage 112 moves at a constant rate in the Y-direction.

While passing above the sheet 101, the heads 113*a* to 113*r* on the carriage 112 is controlled by a nozzle discharge instruction signal based on the bit plane completed as mentioned above.

Thereby, ink droplets are selectively discharged from individual nozzles of the heads 113*a* to 113*r*.

While the heads 113*a* to 113*r* remains apart from above the sheet 102 after passing above the sheet 101, the motor 107 moves the sheet 100 by a given distance d in the X-direction and puts it to a standstill. Here, again the motor 107 moves the sheet 101 at a given rate.

Also at this time, as mentioned above, ink droplets are selectively discharged from individual nozzles of the heads 113*a* to 113*r*.

By executing such recording operation as mentioned above repeatedly, the input image is finally recorded on the sheet 101.

The sheet 101 completed in recording is conveyed by the rollers 104 and 106 to the left in FIG. 2 and thereafter is discharged to outside the apparatus by unillustrated conveyance means.

Density Auto-Calibration of Recorder in This Embodiment

The present recorder has such a function of density auto-calibration as to always keep the density gradation of a record image on a sheet 101 good during a recording operation as mentioned above and this function is carried out, for example, by the image processing unit 207.

First, near the discharge port of a sheet 101, as shown in FIGS. 1 and 2, the density measurement unit 127 for measuring the test pattern density is supported by unillustrated support means.

By measuring the intensity of transmitted light through the sheet 101 (transparency intensity) as mentioned above, the density measurement unit 127 measures the recorded density on the sheet 101. This measured result is used as the data for performing the density auto-calibration.

Specifically, directly after recording the a test pattern 301 as shown in FIG. 6A, the density measurement unit 127 measures the density of the test pattern 301 and generates the data for performing the density auto-calibration on the basis of the measured result.

Figures 13, 14:
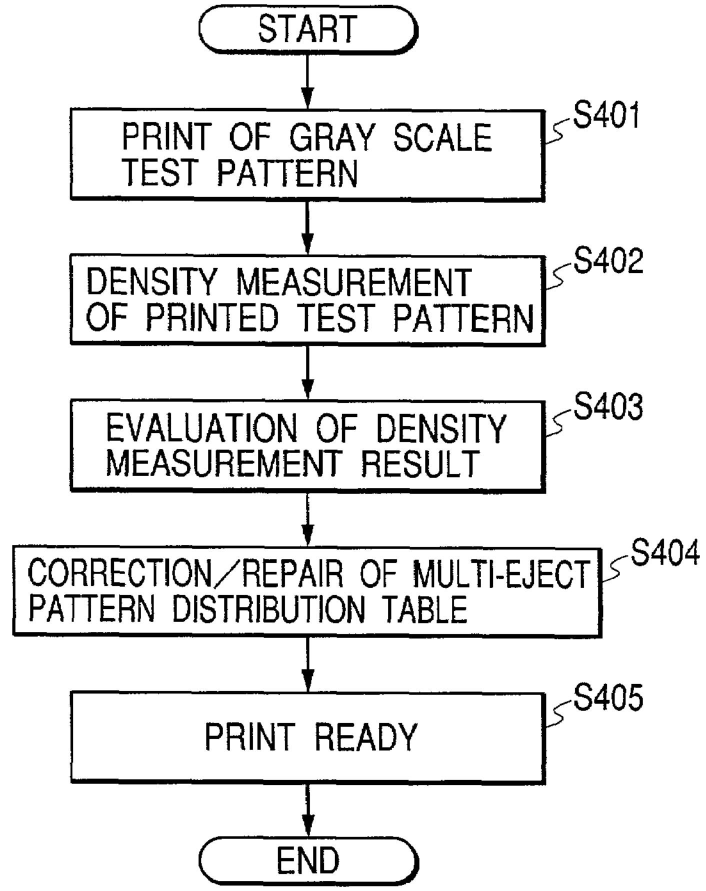
FIG. 13 is a flow chart for illustrating the above described density auto-calibration in the above described record control section.
FIG. 14 is an illustration of another example of correction processing (First Example) at the above described density auto-calibration.

The density auto-calibration is carried out, for example, in accordance with the procedure shown in FIG. 13.

Namely, the CPU 203 executes a processing program according to the flow chart of FIG. 13, so that the present recorder operates as follows.

Step S401:

On the basis of the ink multi-eject combination table 204*b* shown in FIG. 9, the printer unit 209 records the test pattern 301 of FIG. 6A on a single sheet 101 by use of the recording section 100.

Figure 6B:
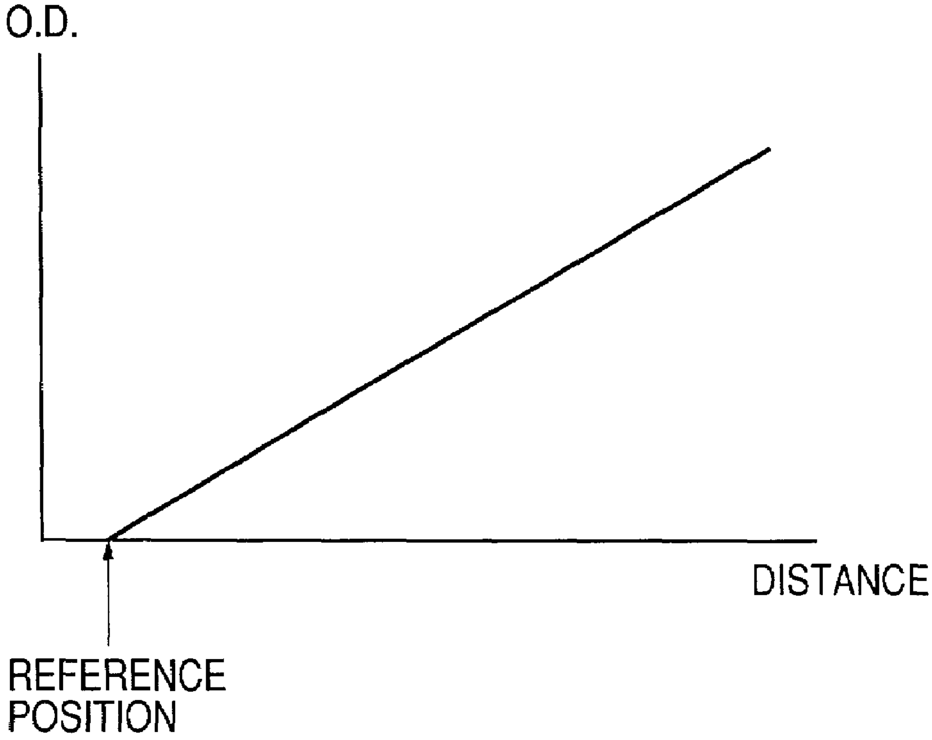

The test pattern 301 here is made of a gray scale test pattern. The gray scale test pattern is a test pattern recorded in the form of a straight line having a certain width, formed so that the density grade is set to a minimum at the reference position on the sheet 101 and rises in proportion to the distance from the reference position to a maximum density grade as shown in FIG. 6B.

Step S402:

At the recording section 100, the density measurement unit 127 measures the density of a gray scale test pattern 301 on the sheet 100.

Step S403:

The image processing unit 207 evaluates the measured result obtained at the density measurement unit 127.

Step S404:

The image processing unit 207 performs the correction processing of the ink multi-eject combination table 204*b* (See FIG. 9) or the like in the storage medium 104.

Here, as the above correction processing, other various processing such as correction of a measurement pitch and an estimation method are considered in addition to the above correction processing such as a correcting process of an ink overlapping-eject combination table 204*b*, but the following processing is referred as one example.

Regarding such as a correcting process of an ink overlapping-eject combination table 204*b*, for example, first, as shown in FIG. 9 described above "0","1", "2", . . . of the No. column are numerals proportional to the density gradation and the value of dl [n] corresponding to No. n represents a density in the pattern of discharge/no discharge of ink #1 to #6 at the No. n. And, the distance of the gray scale test pattern 301 shown in FIG. 6 described above from the reference position corresponds to the numeral of "No.".

Then, the image processing unit 207 writes the measured result of the density of the gray scale test pattern 301 corresponding to the positions of the respective numbers by means of the measured result (refer to Step S402) at the density measurement unit 127.

Besides, in accordance with Equation:

$$th[n]=dl[n-1](dl[n]-dl[n-1])/2,$$

the image processing unit 207 computes the th [n] value and writes it into the column of th [n].

By a correcting process as mentioned above, a proper ink multi-eject combination table 204*b* is obtained for the measured result of the gray scale test pattern 301.

Step S405:

The printer unit 209 becomes a ready state (wait state of recording operation start as mentioned above).

Here, as another example of correction process (See step S404 or the like of FIG. 13 above described) in density auto-calibration as mentioned above, the following processing is also considered.

Correction Processing (Example 1)

First, as with the step S404 mentioned above, the image processing unit 207 acquires the measured result of density of the respective gray scale test pattern 301 corresponding to the position of No. from the measured result (See step S402) at the density measurement unit 127.

Next, regarding the object No. "n", the image processing unit 207 finds the difference Δn between the value of dl [n] on the ink multi-eject combination table 204*b* and the above measured result dl real [n].

And, in accordance with the error Δn, the image processing unit 207 executes the processing shown in FIG. 14. In this processing shown in FIG. 14, the rule for modifying the combination of ink according to the magnitude of error Δn is determined. Thereby, in accordance with the magnitude of error Δn, the ink combination is automatically modified, thus enabling recording of a smaller error.

Incidentally, the processing shown in FIG. 14 is simply one example and the present invention is not limited to this. Depending on the magnitude of error Δn, for example, processing may be defined still more minutely.

Correction Processing (Example 2)

Figure 15A:
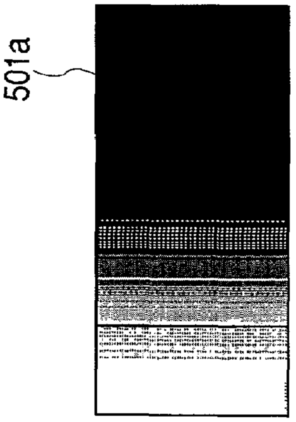
FIGS. 15A, 15B and 15C are illustrations of another example of correction processing (Second Example) at the above described density auto-calibration.
Figure 15B:
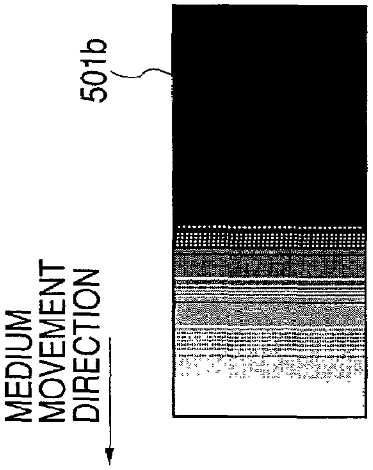
Figure 15C:
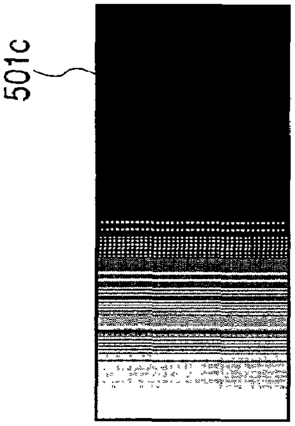
Figure 16:
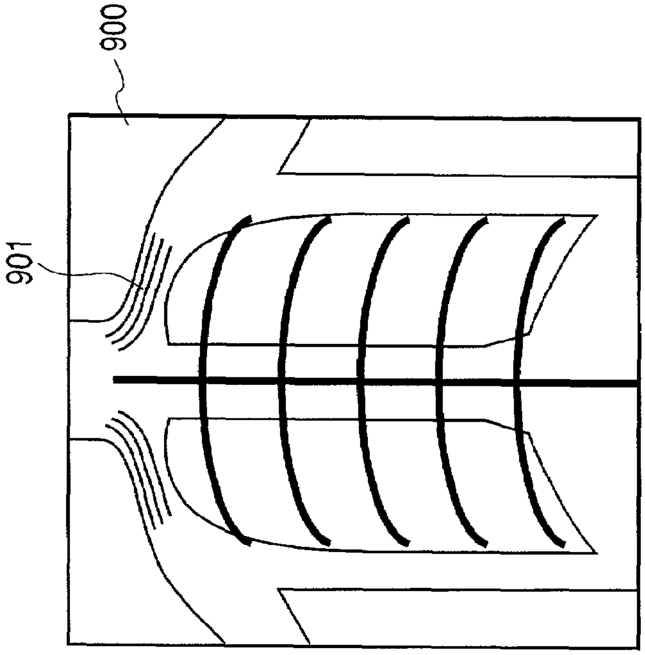
FIG. 16 is an illustration of one example of pseudo contour generated on a recorded image by a conventional recorder.

The printer unit 109 records multiple types of gray scale test patterns with parameters (dl [n], a pattern of discharge/no discharge of ink #1 to # 6 of individual Nos. or the like) in the ink multi-eject combination table 204*b* modified onto the sheet 101. For example, three kinds of gray scale test patterns 501*a* to 501*c* as shown in FIGS. 15A to 15C are recorded on the sheet 101.

At this time, densities of respective gray scale test patterns 501*a* to 501*c* are measured by means of the density measurement unit 127 and the result is displayed by unillustrated display unit.

Thus, a user does not only visually evaluate gray scale test patterns 501*a* to 501*c* on the sheet 101 but also refers to these measured results of densities and selects the pattern of density state being the best in linearity. For example, since the test pattern 501*b* is the best in linearity among the gray scale test patterns 501*a* to 501*c* of FIG. 15, this pattern is selected. The selective operation is performed on the operation 202.

Thereafter, on the basis of the gray scale test pattern selected from a user, the processing beginning with the step S404 of FIG. 13 is executed.

Because of being so arranged as to correct the ink multi-eject combination table 204 used in recording input image data onto the sheet 101 in a dot pattern through multiple nozzles (recording elements) provided on the respective heads 113*a* to 113*r* on the basis of the measured result of densities of test patterns (given images) recorded on the sheet 101 as described above, this embodiment can provide the most suitable ink multi-eject combination table 204*b* for the use in actual recording, while using this ink multi-eject combination table 204*b* for the recording of input image data makes it possible to provide a record image of good gradation.

Besides, even in case of recording a chest X-ray image onto a transparent film, for example, a smooth gradation in the shoulder part or the like is obtained and a suitable record image for the image diagnosis can be provided.

Incidentally, needless to say, the purpose of the present invention is also attained by supplying the storage medium in which the program codes of a software for actualizing the function of a host and terminals according to this embodiment to a system or an apparatus and by the computer (or CPU or MPU) of this system or apparatus reading and executing the program codes stored in the system or apparatus.

In this case, the program codes themselves read out from the storage medium actualize the function of this embodiment and the storage medium storing the program codes constitutes the present invention.

As storage media for supplying a program code, a ROM, floppy disk, hard disk, optical disk, photomagnetic disk, CD-ROM, CD-R, magnetic tape, non-volatile memory card or the like can be used.

Besides, a computer does not only execute the program codes read out, so that this embodiment is actualized, but also the OS or the like working on the computer performs a part or a total of actual processing on the basis of an instruction of the program codes and further, needless to say, the case where the function of this embodiment is actualized by this processing is also included.

Furthermore, after the program code read out from the storage medium is written either into a function extended board inserted in a computer or into a memory provided at the function extended unit connected to a computer, a CPU or the like, provided at the extended function board or the function extended unit, performs a part or a total of actual processing on the basis of the instruction of the program code and, needless to say, the case where the function of this embodiment is actualized by the processing is also included.

Since a high precision correction can be effected to the information item in the storage means to be used for the recording of a target image (a plurality of pattern information items of use/no use of individual recording agents in a plurality of recording elements and a reference information item for determining the pattern information items used during the recording of the target pixels responding to them) as described above, a good record image can be always provided.

What is claimed is:

1. An image processing apparatus of performing a process for recording a target image on a recording medium at unit of a pixel by means of a plurality of recording elements, wherein the plurality of recording elements respectively use a plurality of recording agents of different densities with respect to a same color, said apparatus comprising:

storage means for storing a table of ink superimposed printing, the table including pattern information about use/no use of each of said recording agents in said recording elements for each gradation level and a density of gradation expressed by the corresponding pattern information for each gradation level;

measurement means for measuring a density of a predetermined image recorded in advance on said recording medium on the basis of the table; and correction means for correcting the table in said storage means on the basis of a measured result of said measurement means, wherein the table is corrected by obtaining a difference between the density of gradation and the measured density for each gradation level and changing the pattern information based on magnitude of the difference for each gradation level.

2. The image processing apparatus according to claim 1, wherein said correction means corrects pattern information corresponding to the position of said object pixel on the basis of difference of the density of said object pixel and density of gradation expressed by the pattern corresponding to the position of said object pixel contained in said reference information.

3. The image processing apparatus according to claim 1, wherein said measurement means measures densities of plural predetermined images stored in advance on said recording medium, and wherein said correction means corrects the information within said storage means on the basis of at least either a recorded result on said recording medium or the measured result of the density of any image among said predetermined images externally indicated on the basis of any of the measured results of said measuring means.

4. The image processing apparatus according to claim 1, further comprising control information generation means for generating control information for a recording operation of a target pixel on the basis of the density of the target pixel and the information within said storage means corrected by said correction means.

5. The image processing apparatus according to claim 1, wherein said predetermine image contains a gray-scale test pattern.

6. An image processing system comprising a plurality of devices which are connected to each other in a communicable status, wherein at least one device out of said devices has a function of said image processing apparatus defined in any one of claim 1 and claim 2 to claim 5.

7. An image processing method of recording a target image at unit of a pixel onto a recording medium by means of a plurality of recording elements, wherein the plurality of recording elements respectively use a plurality of recording agents of different densities with respect to a same color, said method comprising:

a first recording step of recording a predetermined image onto said recording medium;

a measurement step of measuring a density of the predetermined image recorded on said recording medium by the first recording step; and a correction step of correcting information in a storage means in which a table of ink superimposed printing is stored, the table including pattern information about use/no use of each of said recording agents in said recording elements for each gradation level and a density of gradation expressed by the corresponding pattern information for each gradation level, wherein the table is corrected by obtaining a difference between the density of gradation and the measured density for each gradation level and changing the pattern information based on magnitude of the difference for each gradation level.

8. The image processing method according to claim 7, wherein said correction step includes a step of correcting the pattern information corresponding to the position of said object pixel on the basis of the difference of the density of said object pixel and density of the gradation expressed by the pattern corresponding to the position of said object pixel contained in said reference information.

9. The image processing method according to claim 7, wherein said first recording step includes a step of recording predetermined images onto said recording medium, wherein said measurement step includes a step of measuring the density of the plural predetermined images recorded by said first recording step on said recording medium; and wherein said correction step includes a step of correcting the information within said storage means on the basis of either a recorded result on said recording medium or the measured result of the density of any image among the plural predetermined image externally indicated on the basis of any of the measured results by means of said measuring step.

10. The image processing method according to claim 7, further comprising a second recording step of carrying out the recording of a target image onto said recording medium on the basis of both the density of the target pixel and the information within said storage means corrected in said correction step.

11. The image processing method according to claim 7, wherein said given image contains a gray-scale test pattern.

12. A storage medium in which a computer readably stores the processing step of the image processing method defined in any one of claim 7 and claim 8 to claim 11.

* * * * *

UNITED STATES PATENT AND TRADEMARK OFFICE

CERTIFICATE OF CORRECTION

PATENT NO. : 7,236,644 B2
APPLICATION NO. : 09/983436
DATED : June 26, 2007
INVENTOR(S) : Suzuki et al.

It is certified that error appears in the above-identified patent and that said Letters Patent is hereby corrected as shown below:

SHEET 10:
FIG. 14, "OR LOSS" should read -- OR LESS --.

COLUMN 1:
Line 16, "¶Since formerly," should read -- ¶(new paragraph) formerly, --;
Line 27, "have put to use," should read -- have been put to use, --;
Line 43, "in case of" should read -- in the case of --;
Line 48, "is prominent" should read -- are prominent --; and
Line 59, "¶On account to" should read -- ¶ (new paragraph) On account of --.

COLUMN 2:
Line 25, "in case of" should read -- in the case of --;
Line 28, "for human being" should read -- for human beings --;
Line 32, "for human being" should read -- for human beings --;
Line 50, "film and image" should read -- film, and images --; and
Line 59, "destructed" should read -- destroyed --.

COLUMN 3:
Line 42, "shoulder" should read -- the shoulder --; and
Line 48, "contour" in a meaning" should read -- contour", meaning --.

COLUMN 4:
Line 14, "grades" should read -- grades of --;
Line 54, "communicable" should read -- communicate --; and
Line 57, "either of first to seventh invention." should read -- any of the first to seventh inventions. --.

COLUMN 5:
Line 6, "density of" should read -- density --;
Line 13, "image and" should read -- image, and --;
Line 40, "nine invention," should read -- ninth invention, --;
Line 47, "nine invention," should read -- ninth invention, --;
Line 50, "medium that" should read -- medium in which --;
Line 53, "in either first to seventh invention" should read -- in any of first to seventh inventions --;
Line 57, "either nineth" should read -- any of ninth --; and
Line 58, "fifteenth invention." should read -- fifteenth inventions. --.

UNITED STATES PATENT AND TRADEMARK OFFICE

CERTIFICATE OF CORRECTION

PATENT NO. : 7,236,644 B2
APPLICATION NO. : 09/983436
DATED : June 26, 2007
INVENTOR(S) : Suzuki et al.

It is certified that error appears in the above-identified patent and that said Letters Patent is hereby corrected as shown below:

COLUMN 8:
Line 6, “denote” should read -- denotes --; and
Line 31, “an transmitted” should read -- a transmitted --.

COLUMN 9:
Line 41, “the aide of” should read -- the aid of --; and
Line 51, “6 different kinds” should read -- six different kinds --.

COLUMN 10:
Line 1, “recording though” should read -- recording through --;
Line 9, “4 kinds” should read -- four kinds --;
Line 19, “4 grades” should read -- four grades --; and
Line 65, “In case” should read -- In the case --.

COLUMN 11:
Line 54, “255 transparent).” should read -- 255:transparent). --.

COLUMN 12:
Line 31, “err” should read -- error err --; and
Line 66, “recording operation” (second occurrence) should be deleted.

COLUMN 13:
Line 11, “is controlled” should read -- are controlled --;
Line 16, “remains” should read -- remain --; and
Line 49, “the a test” should read -- the test --.

COLUMN 15:
Line 47, “in case” should read -- in the case --.

COLUMN 17:
Line 8, “predetermine” should read -- predetermined --;
Line 14, “claim 1 and claim 2 to claim 5.” should read -- claims 1 to 5. --; and
Line 16, “at unit” should read -- at a unit --.

UNITED STATES PATENT AND TRADEMARK OFFICE

CERTIFICATE OF CORRECTION

PATENT NO. : 7,236,644 B2
APPLICATION NO. : 09/983436
DATED : June 26, 2007
INVENTOR(S) : Suzuki et al.

It is certified that error appears in the above-identified patent and that said Letters Patent is hereby corrected as shown below:

<u>COLUMN 18</u>:
Line 34, “claim 7 and claim 8 to claim 11.” should read -- claims 7 to 11. --.

Signed and Sealed this

Twentieth Day of May, 2008

JON W. DUDAS
*Director of the United States Patent and Trademark Office*